(No Model.)

F. A. MAUS.
TWO WHEELED VEHICLE.

No. 281,896. Patented July 24, 1883.

WITNESSES.
Jacob W. Loeper
Chas. S. Spritz.

INVENTOR.
Frank A. Maus
By C. P. Jacobs
Atty.

UNITED STATES PATENT OFFICE.

FRANK A. MAUS, OF INDIANAPOLIS, INDIANA.

TWO-WHEELED VEHICLE.

SPECIFICATION forming part of Letters Patent No. 281,896, dated July 24, 1883.

Application filed January 3, 1883. (No model.)

*To all whom it may concern:*

Be it known that I, FRANK A. MAUS, of Indianapolis, county of Marion, and State of Indiana, have invented a new and Improved Two-Wheeled Vehicle, of which the following is a description, reference being made to the accompanying drawings, in the several figures of which like letters represent like parts.

My invention relates to that class of vehicles which have but two wheels, and is especially adapted to coal-carts and gigs or road-carts, where it is desirable to have the box independent of the shafts, and thus avoid the rocking or thumping motion so common and objectionable in vehicles of this class.

Figure 1:
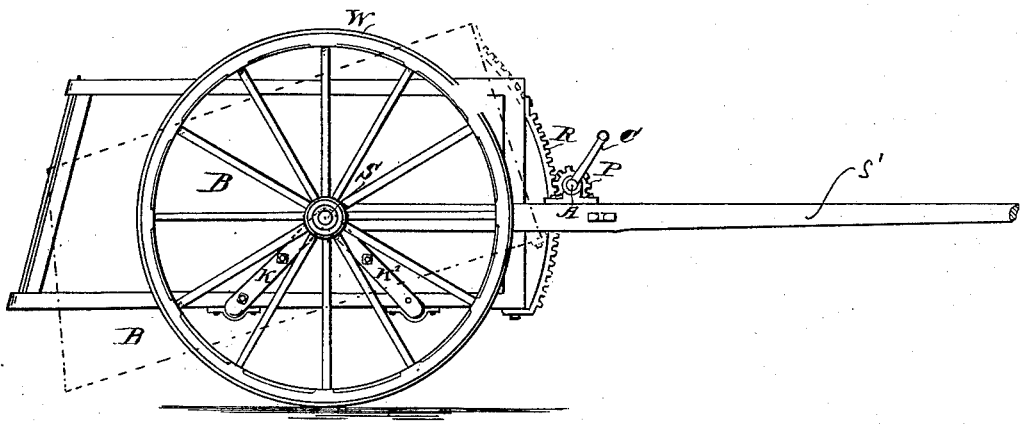
Figure 2:
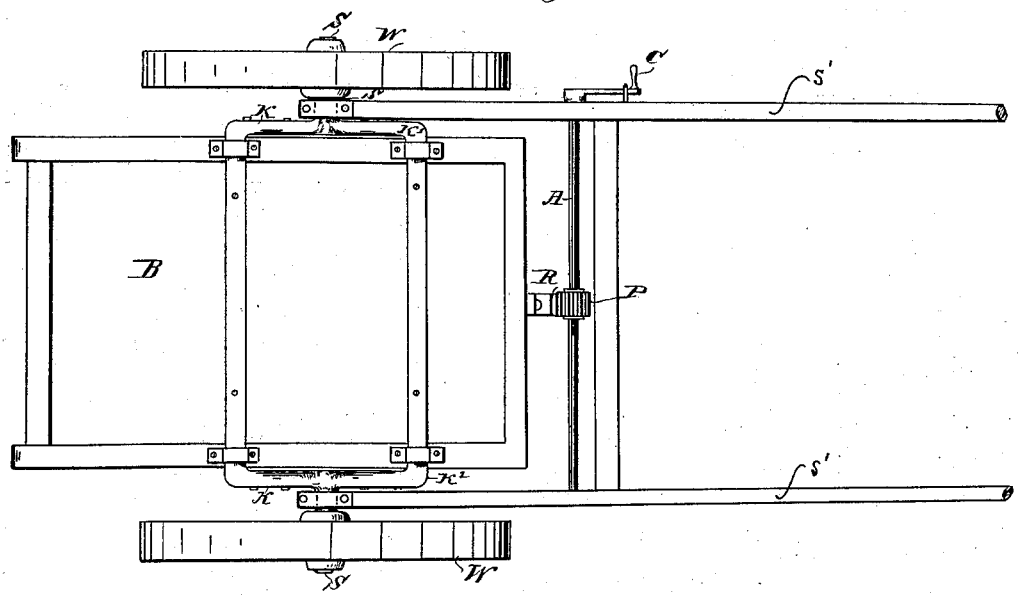

In the drawings, Figure 1 represents a side view of a coal or dump cart mounted on an axle of my invention, and having a wheel and gearing in front for dumping it. The dotted lines indicate the position of the box when the forward end is thrown up for dumping the load. Fig. 2 is a bottom view, showing how the axle is branched and how the cart-box is attached.

In detail, B is the box of the cart, which rests upon and is attached to the branching arms K K' of the crank-axle, whose spindles are indicated by S S, and upon which the wheels W revolve in the ordinary way. At the front end of the box is bolted a segment of a cog-wheel, R, which is made to engage with the geared pinion P, mounted on axis A, and at one end provided with a crank, C, for turning it, the crank being secured, when desired, by a small stop in the shafts.

The shafts S' are mounted in suitable bearings on the crank-axle, between the spindles and the crank-bend, and work freely up and down. By this arrangement the shafts only support their own weight and no part of the load, which is a great relief to the horse and adds much to the comfort of the driver, as the play of the shafts is not communicated to the box.

The two branches of the axle between the spindles thus form a broad and capacious base or bed, upon which the box of the vehicle may easily and securely rest, and this has another great advantage, as high wheels may be used and the box be yet kept near the ground, and also dumped with ease by means of the crank and its geared wheel and segment, or any other equivalent device.

When the cart is dumped it is readily brought back into place and secured by means of the stop shown, or any other suitable means.

Two or more branches may be used in the axle, if desired.

What I claim, and desire to secure by Letters Patent, is—

1. In a two-wheeled vehicle, the combination of an axle having a crank which divides into two branches on either side between the wheels, a box adapted to rest upon the bed formed by these branches, and a pair of shafts loosely connected with the axle, substantially as described.

2. In a two-wheeled vehicle, a crank-axle dividing on either side into two branches between the wheels, in combination with a box adapted to rest upon the bed thus formed by these branches, a pair of shafts loosely connected with the axle, and an apparatus for dumping the same attached to the front part of the box, and operated independently of the shafts, substantially as described.

In witness whereof I have hereunto set my hand this 30th day of December, 1882.

FRANK A. MAUS.

Witnesses:
C. P. JACOBS,
C. S. SPRITZ.